W. E. SNEDIKER.
DIES FOR MAKING SPLIT NUTS.

No. 173,684. Patented Feb. 15, 1876.

UNITED STATES PATENT OFFICE.

WILLIAM E. SNEDIKER, OF TRENTON, NEW JERSEY, ASSIGNOR TO HERMAN BOKER & CO., OF NEW YORK, N. Y.

IMPROVEMENT IN DIES FOR MAKING SPLIT NUTS.

Specification forming part of Letters Patent No. 173,684, dated February 15, 1876; application filed August 12, 1875.

*To all whom it may concern:*

Be it known that I, WILLIAM E. SNEDIKER, of Trenton, in the county of Mercer and State of New Jersey, have invented certain new and useful Improvements in Dies for Making Split Nuts; and I do hereby declare that the following is a full, clear, and exact description of the same, reference being had to the accompanying drawing, which forms part of this specification.

This invention, while applicable to split nuts generally, is more particularly designed to be used in the manufacture of a certain kind of split nut, forming a nut-lock, applicable, among other purposes, to the securing of fish-plates on railroad-bars, and in which the nut for a portion of its thickness is of conical form, which provides for the springing or locking of the nut by reason of the slit or slits in it.

The invention consists in a peculiar construction of dies, and of a clearer operating in connection therewith, for the rapid and perfect production of such nut without any liability of the latter sticking in or on the dies.

Figure 1:
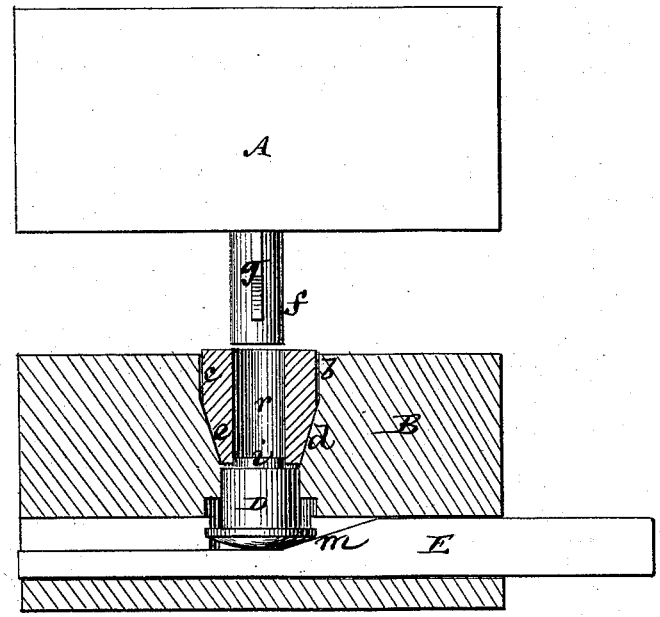
Figure 2:
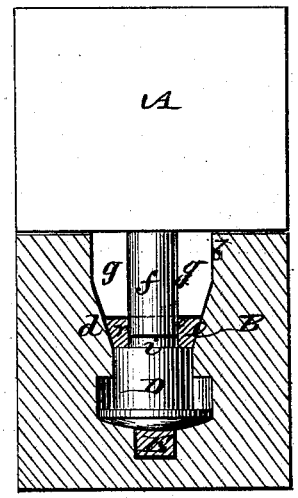
Figure 3:
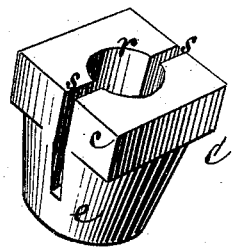

Figure 1 represents a half-sectional side view of a pair of dies with attached clearer, suitable for making partly conical-shaped split nuts, but showing the dies before commencing their operation on the nut-blank; Fig. 2, a half-sectional end view of the same, but showing the dies as having completed their operation on the nut-blank. Fig. 3 is a view, in perspective, of the finished nut.

A is the upper or male, and B the lower or female, die. These dies may be arranged in any suitable power-press, with the female die as stationary and the male die as movable. The forming-recess in the lower or female die is of the required outside contour of the nut, being square or straight-edged for a given depth from its mouth, as at $b$, corresponding with the head $c$ of the nut C, but of conical form, as at $d$, for the remainder of its depth, corresponding with the conical portion $e$ of the nut.

The upper or male die is not recessed on its face to receive any portion of the nut within it, but is made flat or solid, so that when rising, after coming down to form the nut, its tendency to hold on to the nut is reduced. Said male die is furnished on its face with a projecting mandrel, $f$, corresponding with the hole $r$ for the screw-thread in the nut, and such mandrel provided with one or more partly straight and partly conical wings, $g$, to form the slit or slits $s$ in the nut as the upper die is brought down on the lower or female die, the metal displaced by the mandrel with its wings being thrown into the body of the nut, and causing the blank from which the latter is produced, to fill the recess in the lower die. Said nut-blank may be cut from a heated bar, and roughly turned round or formed on a mandrel, and be deposited in a rough or unfinished state within the female die.

As in the making of the nut the shrinkage or cooling of it on the mandrel $f$ and wings $g$ thereof would be apt to cause the nut to stick on the mandrel, and to be drawn up with the latter when the male die rose from its work, and to afterward remove it from the mandrel would require both time and labor such liability of the nut to stick on the mandrel and to be drawn up with the latter is prevented, in part, by the clear face of the male die not receiving the nut within it, in part by the straight edge or portion $b$ at the mouth of the recess in the female die, and again, in part, by a shouldered clearer, D. This shouldered clearer forms the base of the recess in the female die, and has a reduced upper extremity, $i$, which enters within the hole $r$ of the nut, so that, on shrinkage of the latter taking place, it will gripe or hold on to such reduced end $i$ of the clearer, and thus an additional preventing effect is brought into play to restrain the nut from sticking to, and being lifted by, the mandrel. Said clearer rests, when down, on a sliding key, E, having an incline, $m$, on a portion of its upper surface. This key is capable of free motion, in direction of its length, through a slot in the bottom of the female die, and so that, when struck at its butt-end, its incline $m$ will cause the upper shoulder on the clearer to throw out the nut after the male die has risen or retired.

After this the key and clearer are returned to their normal position for a repetition or continuance of the work.

I claim—

1. The male die A, made flush on its face, and provided with a projecting mandrel, $f$, having one or more wings, $g$, in combination with the female die B, having its nut-forming recess made partly straight and partly conical, substantially as specified.

2. The clearer D, constructed with a reduced inner end, $i$, for entry within the nut, in combination with the female die, having the nut-forming recess in it, and the male die, with its attached mandrel, constructed to punch or clear the hole in the nut, and to slit the latter, essentially as described.

W. E. SNEDIKER.

Witnesses:
 JOHN B. BURKE,
 C. P. KITSON.